United States Patent
Teshigawara et al.

(10) Patent No.: US 7,067,091 B2
(45) Date of Patent: Jun. 27, 2006

(54) TREATING AGENT FOR METAL-HYDRIDE-CONTAINING EXHAUST GAS AND METHOD OF PREPARING THE SAME AS WELL AS METHOD OF TREATING METAL-HYDRIDE-CONTAINING EXHAUST GAS

(75) Inventors: Satoshi Teshigawara, Toyama (JP); Minoru Takachi, Toyama (JP); Yoshihiro Matsuda, Toyama (JP); Hidetaka Shibano, Tokyo (JP); Yoshiyuki Tomiyama, Tokyo (JP)

(73) Assignee: Sued-Chemie Catalysts Japan Inc., Tokyo (JP)

( * ) Notice: Subject to any disclaimer, the term of this patent is extended or adjusted under 35 U.S.C. 154(b) by 112 days.

(21) Appl. No.: 10/204,303

(22) PCT Filed: Jun. 28, 2001

(86) PCT No.: PCT/JP01/05595

§ 371 (c)(1),
(2), (4) Date: Aug. 21, 2002

(87) PCT Pub. No.: WO03/002235

PCT Pub. Date: Jan. 9, 2003

(65) Prior Publication Data

US 2003/0092570 A1    May 15, 2003

(51) Int. Cl.
*B01D 47/00*    (2006.01)
(52) U.S. Cl. ...................................... 423/210; 502/407
(58) Field of Classification Search ................ 423/210; 502/407
See application file for complete search history.

(56) References Cited

U.S. PATENT DOCUMENTS

| | | | | |
|---|---|---|---|---|
| 4,743,435 A | * | 5/1988 | Kitahara et al. | 423/210 |
| 5,213,767 A | * | 5/1993 | Smith et al. | 422/177 |
| 5,538,702 A | * | 7/1996 | Smith et al. | 423/210 |
| 5,853,678 A | * | 12/1998 | Sugimori et al. | 423/210 |
| 5,885,845 A | * | 3/1999 | Sugimori et al. | 436/164 |

FOREIGN PATENT DOCUMENTS

| | | |
|---|---|---|
| EP | 0 194 366 | 9/1986 |
| EP | 0 294 142 | 12/1988 |
| JP | 61-129026 | 6/1986 |
| JP | 2-126936 | 5/1990 |
| JP | 6-327931 | 11/1994 |
| WO | WO 95/18674 | 7/1995 |

\* cited by examiner

*Primary Examiner*—Edward M. Johnson
(74) *Attorney, Agent, or Firm*—Young & Thompson

(57) ABSTRACT

An object of the present invention is to provide a treatment agent superior in harm-removing performance to metal hydride containing exhaust gas, and its production method as well as a treatment method. It is a mixture of either copper hydroxide or basic copper carbonate and silicon compound or a mixture, wherein parts of said copper compound and said silicon compound form a complex. A preparation of the treatment agent is made by a precipitation method, wherein a copper salts solution serves as a precipitation mother solution, and a mixture solution of either alkali hydroxide or alkali carbonate and alkali silicate serves as a precipitating agent. A treatment agent obtained as its result shows a high harm-removing performance to the metal hydride gas and a low heat generation, for which reason the agent is useful for treatment of the metal hydride containing exhaust gas generated in semiconductor manufacturing.

2 Claims, 1 Drawing Sheet

Figure 1:
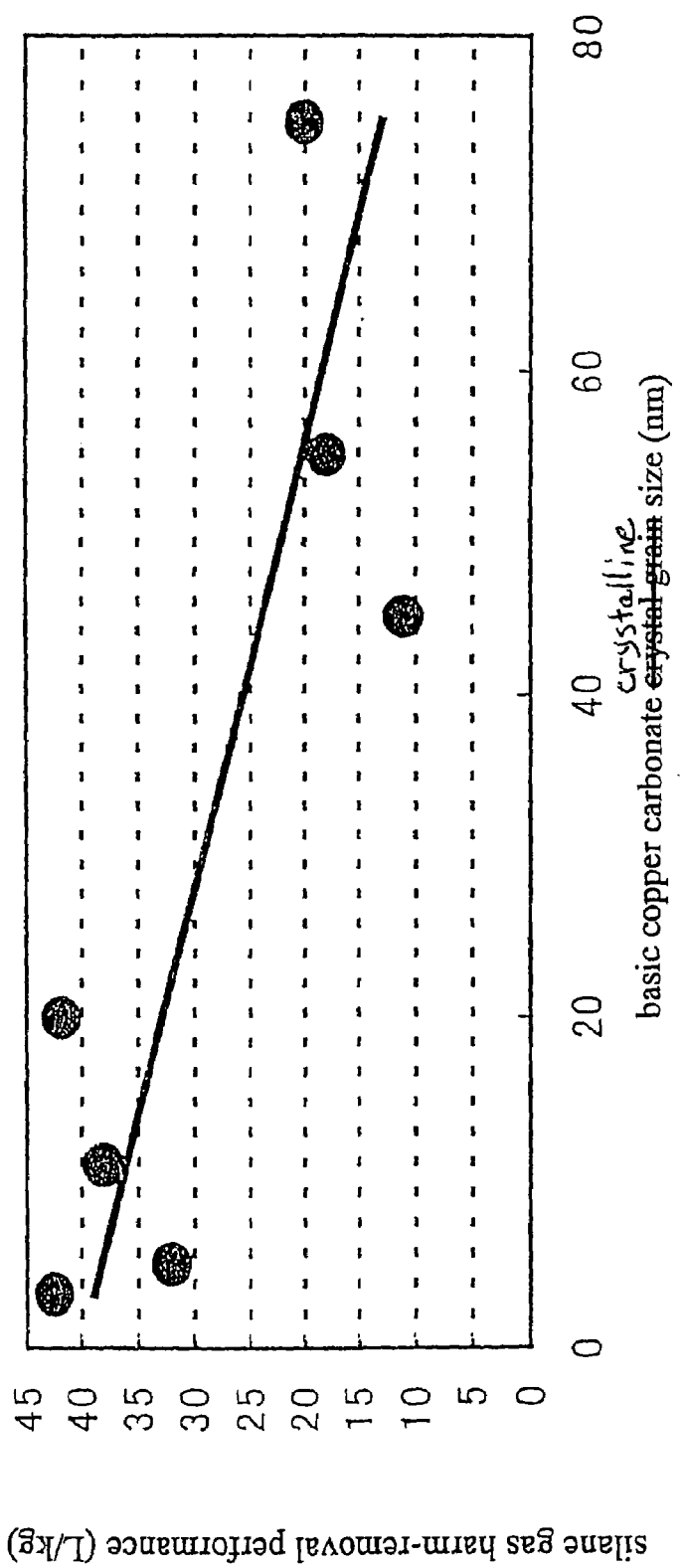

TREATING AGENT FOR METAL-HYDRIDE-CONTAINING EXHAUST GAS AND METHOD OF PREPARING THE SAME AS WELL AS METHOD OF TREATING METAL-HYDRIDE-CONTAINING EXHAUST GAS

TECHNICAL FIELD

The present invention relates to an agent for treatment to metal-hydride-containing exhaust gas and a producing method therefor as well as a method of treatment to metal-hydride-containing exhaust gas, and further particularly relates to an agent for treatment to metal-hydride-containing exhaust gas generated in semiconductor manufacturing processes gas and a producing method therefor as well as a method of treatment to those exhaust gas.

BACKGROUND ART

In semiconductor manufacturing processes in semiconductor manufacturing factories, various metal hydride gases and various halide gases are used. Those gases are combustible and/or harmful, for which reason in view of the environmental conservation, it should not be permitted that exhaust gases containing the same are discharged directly to an atmosphere, but it is necessary to do any treatment for removing those danger and harmfulness.

As the exhaust gases treatment methods, there are a wet method and a dry method. The former is a treatment method for cleaning the exhaust gas with chemicals. On the other hand, the later is a method for flowing an exhaust gas through a tower filled with solid-particles of a treatment agent to cause a chemical function of a harm-removal-requested gas and the treatment agent, namely an absorption reaction and/or a chemical reaction for separation and harm-removal of the dangerous and harmful gas, and it is often used in the treatment for the metal-hydride-containing exhaust gas or the metal halide-containing exhaust gas.

As the solid-particle treatment agent, there have been used a support supporting salts, and particles of metal hydroxide or metal carbonates. At the present, many metal components are disclosed. However, of those treatment agents, the ability of removing the harm from the metal-hydride-containing gas depends on the chemical function between the treatment agent and the metal-hydride-containing gas, for which reason the ability is not permanent. Accordingly, for the actual practice, it is necessary to take a counter-measure for previously detecting any drop of the treatment ability for exchanging with a new treatment agent before the loss of its ability, or flow an exhaust gas through a separately-prepared-tower filled with the treatment agent which will alternatively be exchanged with another of the plural towers.

There appear many patents for the treatment agent for the metal-hydride-containing exhaust gas. For example, the treatment agents comprising metal hydroxide, metal carbonate, and basic metal carbonate are disclosed in Japanese laid-open patent publications Nos. 05-284847, 06-319945, and 08-192024 and Japanese patent publication No. 05-61966.

Those treatment agents disclosed in those patents use a commercially available metal hydroxide as a metal compound, or use a metal hydroxide obtained by a neutralization reaction between metal salts and alkali hydroxide, or use a commercially available metal carbonate as a metal compound, or use a basic metal carbonate obtained by a neutralization reaction between metal salts and alkali carbonate.

Those metal compounds are subjected to a sole use or a combined use with various inorganic compounds such as alumina, silica, heavy metal compounds, titanium oxide and soda-lime for improvement in physical or chemical properties of the metal compounds.

For example, Japanese Patent No. 2926459 discloses the treatment agent as the metal hydroxide, wherein either a commercially available copper hydroxide or a copper hydroxide obtained by a neutralization reaction between copper salt and alkali hydroxide is added with a stabilizing agent of a variety of metal compound.

Japanese Patent Publication No. 5-61966 discloses a treatment agent using a basic copper carbonate as a metal compound. The treatment agent is produced by dry or wet sprinkling, over soda-lime, the basic copper carbonate prepared by the neutralization between copper salts and alkali carbonates.

Japanese patent No. 2604991 discloses a treatment agent using a basic copper carbonate as a metal compound. The treatment agent has been produced as follows. A neutralization reaction between copper salts solution and a sodium carbonate solution is made to obtain a basic copper carbonate which is then subjected to a wet mixture with an anatase-type titanium dioxide for subsequent molding process. The basic copper carbonate is such a compound that if a compound expressed by a molecular formula $CuCO_3Cu(OH)_2$ is obtained by a precipitation in a state that pH-value is neutral or weak alkali, then an amount of OH-group contained in the obtained compound is not less than 1.1 times of it.

Japanese laid-open patent publication No. 8-192024 discloses that a metal carbonate or a metal basic carbonate comprises at least one kind of metal carbonate or metal basic carbonate which is selected from the group consisting of Cu, Zn, Mn, Fe, Co and Ni, and this metal carbonate or metal basic carbonate is available as an agent or an industrial chemical, or is produced from the corresponding metal salts solution by an ordinal measure. It is also disclosed that the metal carbonate or the metal basic carbonate are molded to form a treatment agent.

Japanese laid-open patent publications Nos. 10-235185 and 11-019475 disclose treatment agents of metal oxides, which main component is an oxide selected from two or more metal oxides, for example, copper oxide, silver oxide, manganese dioxide, and is capable of harm-removal of an exhaust gas containing a large amount of a high concentration metal hydride gas at an ordinal temperature.

In the above publication, it is also disclosed that in case that the metal compound is hydroxide or carbonates, then its color change appears by an adsorption of the harm-removing gas and/or a chemical reaction with the harm-removing gas, for which reason color change of the treatment agent may be viewed or monitored to detect a residual harm-removing performance of the treatment agent. The treatment agent serves as a detecting agent for detecting a leakage of the metal hydride gas in addition to the role of the treatment agent.

The treatment by the metal compound to the metal hydride containing exhaust gas depends on the adsorption and/or chemical reaction between the treatment agent and the harm-removal-target gas. In order to increase the treatment performance for treating the metal hydride gas by the treatment agent, it is effective to increase the adsorption, the adsorbing capacity and the reactivity. However, the above-described conventional treatment agent comprising the metal hydroxide, the metal carbonate or the metal basic carbonate is merely prepared by molding either the normal industrial chemical or the precipitated compounds, or is merely prepared by mixture with other compounds and subsequent molding process. There resides a possibility of improvement in the performance.

The chemical reactions in the treatments to the exhaust gases are exothermic reactions, for which reason a temperature increase is unavoidable for the treatment to the exhaust gas by the metal compounds. The treatment to the exhaust gas containing the high concentration metal hydride or a large amount of the exhaust gas may cause a possible large temperature increase. For this reason, the treatment is required to show high performance and low heat-generation.

Particularly, if the exhaust gas includes hydrogen, a heat generated in the treatment is accumulated to increase a layer or a bed of the treatment agent, which may give rise a possible reduction reaction of the metal component of the treatment agent with hydrogen. This reduction reaction is also exothermic reaction. The temperature increase is further emphasized, thereby causing a possible change or deterioration in physical property of the metal component of the treatment agent, and further a possible undesired influence to the quality of the material of the exhaust gas treatment system. Accordingly, if the exhaust gas includes hydrogen, then the treatment agent is required not only to show high performance for removing harm but also to cause a low heat generation.

DISCLOSURE OF THE INVENTION

The harm-removing function of the treatment agent to the metal hydride containing exhaust gas depends on an adsorption and/or a reaction between the treatment agent and the metal hydride containing exhaust gas, for which reason it is presumed that reduction in crystalline size of the effective component of the treatment agent with increasing those surface area improves the harm-removing performance. It is, however, considered that the metal compounds source materials used in the known treatment agent are metal compounds prepared by a neutralization reaction between commercially available metal hydroxide, basic metal carbonate or those salts and an alkali compound, and thus the source materials do not necessarily have a physical property matched to the object or purpose.

In case that the metal compound is produced by a neutralization reaction between its salts and an alkali compound, the obtained precipitate is then subjected to aging, washing, filtration and drying processes to complete the product. Crystalline size and surface area of the finally obtained metal compound depend on the kind of the alkali compound used as the precipitating agent, the neutralization reaction conditions, and drying conditions.

The present inventors have modified the production conditions to improve the properties of the effective metal components for improving the performance of the treatment agent to the metal hydride containing exhausts gas, thereby investigating a possible achievement of the improvement in the performance, as well as have added a structural-stabilizing material to the metal compound for achieving fine-crystallization and a high surface area. As the structural-stabilizing material for the compound, silica, alumina, magnesia, titania, and zirconia have been known. A simple physical mixture and addition of those materials to the metal compound caused small effects of fine-crystallization and high surface area. A metal salts solution precipitated with those material was used as a precipitation mother solution to do precipitation operations for addition into the metal compounds, resulting in small effects of fine-crystallization and high surface area.

During the process for improving the property of the metal compounds, it was attempted to do co-precipitation with the effective metal components for addition instead of addition of the powdered structural-stabilizing material into the precipitation mother solution. In the treatment by the metal compounds to the metal hydride containing exhausts gas, an adsorption function and/or a chemical reaction are caused immediately after the initiation, and a temperature of the treatment agent is increased over time, followed by an entry into a chemical reaction which is continued as a center of a harm-removing process until a majority of the metal component is consumed. Chemical form and heat generation of the metal components may be considered so that metal hydroxide, metal carbonate and metal basic carbonate are lower in heat generation than metal oxides during the harm-removing process. For these reasons, a precipitate co-precipitated with the above-described structural stabilizing agent has been finally processed with the drying process. Various trial-and-errors have been made to investigate the effects.

Namely, an alkali hydroxide, an alkali carbonate or an alkali bicarbonate is used as a precipitating agent, into which an alkali silicate is added and dissolved, for use as a precipitating agent to cause a neutralization reaction with metal salt with co-precipitation of metal component and silicon component. The obtained precipitate comprises a mixture of those compounds or a mixture, a part of which comprises a complex of those compounds. It was found that this mixture has a high dispersion of the metal components and a high surface area. This mixture was then subjected to a test for measuring a harm-removing performance to the metal hydride containing gas. It was confirmed that the mixture shows a smaller temperature increase due to heat generation and a higher performance than the treatment agent comprising the metal oxide, whereby the present invention was completed.

The present invention relates to a treatment agent for a metal hydride containing exhaust gas, and its production method as well as a method of treatment to the metal hydride containing exhaust gas, wherein the agent comprises a mixture of a silicon compound with either copper hydroxide or basic copper carbonate, which is produced by a neutralization reaction between a copper salts solution and an alkali-silicates-containing alkali hydroxide solution, an alkali-silicates-containing alkali carbonate solution or an alkali-silicates-containing alkali bicarbonates solution, or comprises such a mixture that a part of either said copper hydroxide or said basic copper carbonate forms a complex with a silicon compound, wherein said mixture has a Cu/Si atomic ratio ranged from 1~10.

As copper salts used in accordance with the present invention, any salts may be usable, provided that the salt is nitrate, sulfate, chloride, organic acid salts, water soluble salts. In accordance with the present invention, a solution (A-solution) of said copper salts is used as a precipitation mother solution.

The compound used as the precipitation agent is alkali hydroxide, alkali carbonate or alkali bicarbonate. As alkali, sodium or potassium is used. As alkali silicate, sodium silicate represented by a chemical formula $Na_2O \cdot nSiO_2 \cdot nH_2O$ ($n=2\sim4$) and potassium silicate represented by a chemical formula $K_2O \cdot nSiO_2 \cdot nH_2O$ ($n=3\sim4$) are preferable. A mixture solution (B-solution) is used as a precipitation agent, wherein alkali silicate is added and dissolved into an alkali hydroxide solution, an alkali carbonate solution or an alkali bicarbonate solution.

The atomic ratio of Cu/Si in contents is ranged from 1~10. It was confirmed from structural analysis by X-ray diffraction that if the atomic ratio is less than 1, a majority of the copper compound forms a complex with silicon compound. A small content of the free copper compound which is highly reactive to the metal hydride containing gas is not preferable as having a small capacity of harm-removal of the treatment agent. If the atomic ratio is larger than 10, then the treatment agent with a high surface area comprising fine copper compounds is not obtained. The property of the treatment agent obtained is not preferable.

As precipitation operation, there is a normal neutralization by adding the B-solution into the A-solution, an inverse neutralization by adding the A-solution into the B-solution, or a neutralization by concurrently adding, under a constant pH, the A-solution and the B-solution into a water in a precipitation bath prepared. Any operations may generate desired precipitate. It is, however, important that at the final of the operations, the pH value is in the range of neutral to weak alkali. If the pH value becomes out of this range, the treatment agent of the copper compound with the desired property is not obtained.

After the precipitate obtained by the neutralization reaction is aging, the precipitate is then subjected to washing and drying processes, wherein the washing is to remove alkali compound mixed in the precipitate and suppress any change in property of the obtained treatment agent in later processes. It is preferable to carry out the washing until the residual alkali content in the finally obtained treatment agent becomes not more than 0.1%. A subsequent drying process is preferably carried out in a temperature range of 80~200° C. which does not cause any thermal property change of the treatment agent compound and which is suitable for shortening the production time. If the temperature is lower than 80° C., it takes a long time to do the drying process, and this is not suitable in practicing. If the temperature is higher than 200° C., part of copper hydroxide or basic copper carbonate is decomposed to form a black copper oxide, for which reason it is difficult to monitor the residual harm-removing performance of the treatment agent in practice depending upon the color change. This allows a drop of the harm-removal performance, and also particularly allows a large heat generation in the treatment process for the metal hydride containing exhaust gas which contains hydrogen.

The obtained dried material is blue and is a mixture of either copper hydroxide or basic copper carbonate with a silica having a crystal or a mixture, wherein part of those compounds forms a complex. This mixture comprises crystallites which have a BET-surface area of not less than 100 m2/g obtained by a nitrogen adsorption and a crystalline size of not more than 50 nm of copper hydroxide or basic copper carbonate. If the surface area is less than 100 m2/g, then the high performance treatment agent is not obtained. If the crystalline size of the copper compound is larger than 50 nm, the high performance treatment agent is not obtained due to inefficient copper dispersion. This is apparent from FIG. 1 which shows a relationship between the crystalline size of the basic copper carbonate in the treatment agent and the silane gas harm-removal performance as the metal hydride gas. As the crystalline size of the basic copper carbonate is small, then the harm-removal performance is high. This relationship is also similar to between the crystalline size of the copper hydroxide and the harm-removal performance of the metal hydride gas.

If alkali hydroxide is used as a precipitating agent, the metal compound of the present invention is a mixture of a cupric hydroxide and a silicon compound or a mixture, wherein part of copper hydroxide and silicon compound forms a complex. If alkali carbonate or alkali bicarbonate is used as the precipitating agent, the compound is a mixture of basic copper carbonate and a silicon compound or a mixture, wherein part of those compounds forms a complex. If the basic copper carbonate is compounds represented by CuCO3.2Cu(OH)2, 3CuCO3.5Cu(OH)2.H2O, CuCO3.Cu(OH)2, CuCO3.Cu(OH)2.H2O, and if an alkali carbonate solution or an alkali bicarbonate solution is used in the neutralization reaction with the copper salts solution, the content of carbonate calculated as carbon dioxide gas is preferably not less than 5% of a total weight. If the content is less than 5%, then part thereof is oxide, and this causes a large heat generation in the treatment process for the metal hydride containing exhaust gas, resulting in a low harm-removal performance.

Subsequently, the treatment method in accordance with the present invention will be described. A neutralization reaction between a copper salt solution and an alkali hydroxide solution containing alkali silicate, an alkali carbonate solution and an alkali bicarbonate solution is carried out to obtain a precipitate which is then subjected to aging and washing and drying processes, thereby obtaining a dry material. This dry material is then subjected to extrusion and pressing to obtain a molded product which is the treatment agent in accordance with the present invention. The treatment agent is packed in a flow-type reactor, so that the agent is made into contact with a reducing exhaust gas containing a metal hydride for removing the metal hydride gas.

The metal hydride gases, which may be removed by the treatment agent of the present invention, are, for example, silane, arsine, phosphine, disilane, diborane, hydrogen selenide, germane, and dichlorosilane. The treatment agent of the present invention mainly includes copper hydroxide or basic copper carbonate, for which reason the agent has green color. Adsorption and/or chemical reaction upon contact with the metal hydride gases cause color-change, for which reason any color-change is viewed and observed to confirm the residual treatment performance.

The present invention operates as follows. The treatment agent produced in accordance with a series of the operations of the present invention is filled into a stainless-steel flow-type reactor. A reducing gas containing silane or phosphine as metal hydride gas is flown through the reactor and a temperature of the treatment agent bed is measured, while an amount of leakage of the metal hydride gas in an outlet gas is measured and monitored by a Breakage Monitor (available from Bionics Inc.) to carry out the examination for measuring the harm-removal performance of the metal hydride containing gas in the ordinary temperature.

As a result, the metal hydride was not detected in the outlet gas for a long time. The harm-removal performance (L/kg) thereof was higher than the treatment agents comprising the known metal compounds of the same kinds, namely the treatment agent including only the effective components or the treatment agent added with the structural stabilizing agent by other method as the co-precipitation. It was confirmed that the present treatment agent is superior in performance of removing the metal hydride gas.

A similar examination was carried out by using oxide-based treatment agent. After the examination was initiated, an uncontrolled reaction appears, which causes a remarkable increase in temperature of the treatment agent bed, so that it becomes difficult to continue the performance-measuring examination. It was also confirmed that by contrast, the treatment agent of the present invention exhibited a temperature increase of the filling bed which is, however, not such an intense heat generation as interruption of the examination. The present invention was thus completed.

BRIEF DESCRIPTIONS OF THE DRAWINGS

FIG. 1 is a view showing a relationship between crystalline size of basic copper carbonate and harm-removal performance of silane gas.

BEST MODE FOR CARRYING OUT THE INVENTION

Subsequently, the contents of the present invention will be described in detail with reference to examples. For the treatment agent of the present invention, the examination for measuring the harm-removal performance of the metal hydride gas was carried out for evaluation on performance. A measurement to a surface area in BET-method and a measurement to the crystalline size of the metal compound in X-ray diffraction were carried out for evaluation on property. For the harm-removal performance examination, a measuring apparatus, a measuring condition, a measuring operation method and a harm-removal performance calculation method were as follows.

(Harm-removal Performance Measuring Apparatus and Measuring Condition for the Metal Hydride Gas)

harm-removal performance measuring apparatus: normal pressure flow type reactor size of reaction tube: inner diameter 50 mm, length 1200 mm.

harm-removal performance measuring condition amount in use of treatment agent: 590 cc (filling height 300 mm)

GHSV: 320 hr-1 pressure: ambient pressure reaction temperature: ambient temperature reaction gas composition: SiH4 (or PH3) 1% by volume (H2 4% by volume)

N2 balance (Method of Operating Measurement of the Harm-removal Performance of the Metal Hydride Gas and Method of Calculating the Harm-removal Performance)

590 cc of the treatment agent was filled into the reaction tube so that the filling height is 300 mm. The reaction tube was set in the measuring apparatus. Subsequently, the metal hydride gas of the above composition was flown through the treatment agent filled bed. After the gas flow was initiated, the temperature of the treatment agent bed was measured, while the leakage of the metal hydride gas to the outlet gas of the reaction tube was measured and monitored by Breakage monitor (Nihon Bionics Inc.). An accumulated amount of silane or phosphine as flown until an outlet concentration becomes 5 ppm in case of silane (SiH4) or 0.1 ppm in case of phosphine (PH3) was found, so that the accumulated amount was then converted into an amount per 1 kg of the treatment agent. For example, based on the above measured result, the harm-removal performance of the metal hydride gas was calculated in accordance with the following equation:

harm-removal performance (L/kg)=$A \times (B/100) \times (C/E)$ where

A: the measured gas flow rate (L/min.)

B: the metal hydride gas concentration (% by volume)

C: the time period for flowing the accumulating gas until the outlet concentration of the metal hydride gas achieves a predetermined concentration (min.)

E: the amount of filling the treatment agent (kg)

EXAMPLE-1

1.5 kg of copper sulfate was taken into 20 L-beaker and 10 L of pure water was added for stirring and dissolution to prepare a precipitate mother solution (A-solution) Separately from this, 2.1 kg of a solution with 15% of No. 3 sodium silicate and 0.62 kg of sodium carbonate were taken into 20 L-beaker and 10 L of pure water was added for stirring and dissolution to prepare a precipitate agent solution (B-solution). The B-solution was dropped gradually into the A-solution which was being stirred hardly to form a precipitate. The obtained precipitate was then subjected to aging and subsequent sufficient washing and filtration before drying the same in air at 110° C. for obtaining dry powders.

The obtained powders were transferred into a kneader and an approximate amount of pure water was added and sufficiently mixed prior to an extrusion molding. The extrusions were then dried at 110° C. thereby to prepare a metal hydride containing exhaust gas treatment agent of Example-1. Of this treatment agent, Cu/Si(atomic ratio), BET-surface area and crystalline size of copper compound were as shown on Table-1, while the measured result of the harm-removal performance of the metal hydride in the absence of hydrogen was as shown on Table-2.

EXAMPLE-2

A metal hydride containing exhaust gas treatment agent of Example-2 was prepared in the same preparation method as Example-1, except that respective amounts in use of copper sulfate, a solution with 15% of No. 3 sodium silicate and sodium carbonate were 1.7 kg, 1.5 kg and 0.7 kg, and also that the A-solution was dropped gradually into the B-solution which was being stirred hardly to form a precipitate. Of this treatment agent, Cu/Si(atomic ratio), BET-surface area and crystalline size of copper compound were as shown on Table-1, while the measured result of the harm-removal performance of the metal hydride in the absence of hydrogen was as shown on Table-2.

EXAMPLE-3

A metal hydride containing exhaust gas treatment agent of Example-3 was prepared in the same preparation method as Example-1, except that respective amounts in use of copper sulfate, a solution with 15% of No. 3 sodium silicate and sodium carbonate were 1.9 kg, 0.9 kg and 0.9 kg. Of this treatment agent, Cu/Si(atomic ratio), BET-surface area and crystalline size of copper compound were as shown on Table-1, while the measured result of the harm-removal performance of the metal hydride in the absence of hydrogen was as shown on Table-2.

EXAMPLE 4

A metal hydride containing exhaust gas treatment agent of Example-4 was prepared in the same preparation method as Example-1, except that respective amounts in use of copper sulfate, a solution with 15% of No. 3 sodium silicate and sodium carbonate were 2.0 kg, 0.58 kg and 0.92 kg. Of this treatment agent, Cu/Si(atomic ratio), BET-surface area and crystalline size of copper compound were as shown on Table-1, while the measured result of the harm-removal performance of the metal hydride in the absence of hydrogen was as shown on Table-2.

EXAMPLE-5

A metal hydride containing exhaust gas treatment agent of Example-5 was prepared in the same preparation method as Example-2, except that instead of sodium carbonate, 0.78 kg of potassium carbonate was used. Of this treatment agent, Cu/Si(atomic ratio), BET-surface area and crystalline size of copper compound were as shown on Table-1, while the measured result of the harm-removal performance of the metal hydride in the absence of hydrogen was as shown on Table-2.

EXAMPLE-6

A metal hydride containing exhaust gas treatment agent of Example-6 was prepared in the same preparation method as Example-2, except that instead of sodium carbonate, 0.48 kg of sodium hydroxide was used. Of this treatment agent, Cu/Si(atomic ratio), BET-surface area and crystalline size of copper compound were as shown on Table-1, while the measured result of the harm removal performance of the metal hydride in the absence of hydrogen was as shown on Table-2.

EXAMPLE-7

A metal hydride containing exhaust gas treatment agent of Example-7 was prepared in the same preparation method as Example-2, except that the molding was dried at a temperature of 180° C. Of this treatment agent, Cu/Si(atomic ratio), BET-surface area and crystalline size of copper compound were as shown on Table-1, while the measured result of the harm-removal performance of the metal hydride in the absence of hydrogen was as shown on Table-2.

EXAMPLE-8

A metal hydride containing exhaust gas treatment agent of Example-8 was prepared in the same preparation method as Example-2, except that instead of copper sulfate and sodium carbonate, 1.64 kg of copper nitrate and 1.1 kg of bicarbonate soda were used. Of this treatment agent, Cu/Si(atomic ratio), BET-surface area and crystalline size of copper compound were as shown on Table-1, while the measured result of the harm-removal performance of the metal hydride in the absence of hydrogen was as shown on Table-2.

EXAMPLE-9

1.5 kg of copper sulfate was taken into 20 L-beaker and 10 L of pure water was added for stirring and dissolution to prepare a precipitate mother solution (A-solution) Separately from this, 2.1 kg of a solution with 15% of No. 3 sodium silicate and 0.62 kg of sodium carbonate were taken into 20 L-beaker and 10 L of pure water was added for dissolution to prepare a precipitate agent solution (B-solution). The A-solution was dropped gradually into the B-solution which was being stirred hardly to form a precipitate. The obtained precipitate was then subjected to aging and subsequent sufficient washing and filtration before drying the same in air at 110° C. for obtaining dry powders.

The obtained powders were transferred into a kneader and an approximate amount of pure water was added and sufficiently mixed prior to an extrusion molding. The extrusions were then dried at 110° C. thereby to prepare a metal hydride containing exhaust gas treatment agent of Example-9. Of this treatment agent, Cu/Si(atomic ratio), BET-surface area and crystalline size of copper compound were as shown on Table-1, while the measured result of the harm-removal performance of the metal hydride in the presence of 4%-hydrogen and heat generation in this harm-removal measurement were as shown on Table-3.

EXAMPLE-10

A metal hydride containing exhaust gas treatment agent of Example-10 was prepared in the same preparation method as Example-9, except that respective amounts in use of copper sulfate, a solution with 15% of No. 3 sodium silicate and sodium carbonate were 1.7 kg, 1.5 kg and 0.7 kg. Of this treatment agent, Cu/Si(atomic ratio), BET-surface area and crystalline size of copper compound were as shown on Table-1, while the measured result of the harm-removal performance of the metal hydride in the presence of 4%-hydrogen and heat generation in this harm-removal measurement were as shown on Table-3.

EXAMPLE-11

A metal hydride containing exhaust gas treatment agent of Example-11 was prepared in the same preparation method as Example-9, except that respective amounts in use of copper sulfate, a solution with 15% of No. 3 sodium silicate and sodium carbonate were 1.9 kg, 0.9 kg and 0.9 kg. Of this treatment agent, Cu/Si(atomic ratio), BET-surface area and crystalline size of copper compound were as shown oh Table-1, while the measured result of the harm-removal performance of the metal hydride in the presence of 4%-hydrogen and heat generation in this harm-removal measurement were as shown on Table-3.

EXAMPLE-12

A metal hydride containing exhaust gas treatment agent of Example-12 was prepared in the same preparation method as Example-9, except that respective amounts in use of copper sulfate, a solution with 15% of No. 3 sodium silicate and sodium carbonate were 2.0 kg, 0.58 kg and 0.92 kg. Of this treatment agent, Cu/Si(atomic ratio), BET-surface area and crystalline size of copper compound were as shown on Table-1, while the measured result of the harm-removal performance of the metal hydride in the presence of 4%-hydrogen and heat generation in this harm-removal measurement were as shown on Table-3.

EXAMPLE-13

A metal hydride containing exhaust gas treatment agent of Example-13 was prepared in the same preparation method as Example-10, except that instead of sodium carbonate, 0.78 kg of potassium carbonate was used. Of this treatment agent, Cu/Si(atomic ratio), BET-surface area and crystalline size of copper compound were as shown on Table-1, while the measured result of the harm-removal performance of the metal hydride in the presence of 4%-hydrogen and heat generation in this harm-removal measurement were as shown on Table-3.

EXAMPLE-14

A metal hydride containing exhaust gas treatment agent of Example-14 was prepared in the same preparation method as Example-10, except that instead of sodium carbonate, 0.48 kg of sodium hydroxide was used. Of this treatment agent, Cu/Si(atomic ratio), BET-surface area and crystalline size of copper compound were as shown on Table-1, while the measured result of the harm-removal performance of the metal hydride in the presence of 4%-hydrogen and heat generation in this harm removal measurement were as shown on Table-3.

EXAMPLE-15

A metal hydride containing exhaust gas treatment agent of Example-15 was prepared in the same preparation method as Example-10, except that the extrusions were dried at a temperature of 180° C. Of this treatment agent, Cu/Si (atomic ratio), BET-surface area and crystalline size of copper compound were as shown on Table-1, while the measured result of the harm-removal performance of the metal hydride in the presence of 4%-hydrogen and heat generation in this harm-removal measurement were as shown on Table-3.

EXAMPLE-16

A metal hydride containing exhaust gas treatment agent of Example-16 was prepared in the same preparation method as Example-10, except that instead of copper sulfate and sodium carbonate, 1.64 kg of copper nitrate and 1.1 kg of sodium bicarbonate were used. Of this treatment agent, Cu/Si(atomic ratio), BET-surface area and crystalline size of copper compound were as shown on Table-1, while the measured result of the harm-removal performance of the metal hydride in the presence of 4%-hydrogen and heat generation in this harm-removal measurement were as shown on Table3.

COMPARATIVE EXAMPLE-1

2.2 kg of copper sulfate was taken into 20 L-beaker and 10 L of pure water was added for stirring and dissolution to prepare a precipitate mother solution (A-solution) Separately from this, 1.12 kg of sodium carbonate was taken into 20 L-beaker and 10 L of pure water was added for stirring and dissolution to prepare a precipitate agent solution (B-solution). The B-solution was dropped gradually into the A-solution which was being stirred hardly to form a precipitate. The obtained precipitate was then subjected to aging and subsequent sufficient washing and filtration before drying the same in air at 110° C. for obtaining dry powders.

The obtained powders were transferred into a kneader and an approximate amount of pure water was added and sufficiently mixed prior to an extrusion molding. The extrusions were then dried at 110° C. thereby to prepare a metal hydride containing exhaust gas treatment agent of Comparative Example-1. Of this treatment agent, Cu/Si(atomic ratio), BET-surface area and crystalline size of copper compound were as shown on Table-1, while the measured result of the harm-removal performance of the metal hydride in the absence of hydrogen was as shown on Table-2.

COMPARATIVE EXAMPLE-2

1.5 kg of a solution with 15% of No. 3 sodium silicate was taken into 20 L-beaker and 10 L of pure water was added to dilute the solution. 1700 cc of a 5% -sulfuric acid solution was gradually dropped into the diluted solution for neutralization of the solution to obtain a precipitate. This precipitate was then subjected to sufficient washing, drying and grinding processes to previously prepare silica compound powders. 1.7 kg of copper sulfate was taken into 20 L-beaker and 10 L of pure water was added for stirring and dissolution to prepare a precipitate mother solution (A-solution). Separately from this, 0.87 kg of sodium carbonate was taken into 20 L-beaker and 10 L of pure water was added for stirring and dissolution and further the full amount of the above-previously prepared silicon compound was added to prepare a precipitate agent solution (B-solution). The A-solution was dropped gradually into the B-solution which was being stirred hardly to form a precipitate. The obtained precipitate was then subjected to aging and subsequent sufficient washing and filtration before drying the same in air at 110° C. for obtaining dry powders.

The obtained powders were transferred into a kneader and an approximate amount of pure water was added and sufficiently mixed prior to an extrusion molding. The extrusions were then dried at 110° C. thereby to prepare a metal hydride containing exhaust gas treatment agent of Comparative Example-2. Of this treatment agent, Cu/Si(atomic ratio), BET-surface area and crystalline size of copper compound were as shown on Table-1, while the measured result of the harm-removal performance of the metal hydride in the absence of hydrogen was as shown on Table-2.

COMPARATIVE EXAMPLE-3

A metal hydride containing exhaust gas treatment agent of Comparative Example-3 was prepared in the same preparation method as Example-1, except that respective amounts in use of copper sulfate, a solution with 15% of No. 3 sodium silicate and sodium carbonate were 2.09 kg, 0.30 kg and 1.04 kg. Of this treatment agent, Cu/Si(atomic ratio), BET-surface area and crystalline size of copper compound were as shown on Table-1, while the measured result of the harm-removal performance of the metal hydride in the absence of hydrogen was as shown on Table-2.

COMPARATIVE EXAMPLE-4

A metal hydride containing exhaust gas treatment agent of Comparative Example-4 was prepared in the same preparation method as Example-1, except that respective amounts in use of copper sulfate, a solution with 15% of No. 3 sodium silicate and sodium carbonate were 0.88 kg, 3.80 kg and 0.20 kg. Of this treatment agent, Cu/Si(atomic ratio), BET-surface area and crystalline size of copper compound were as shown on Table-1, while the measured result of the harm-removal performance of the metal hydride in the absence of hydrogen was as shown on Table-2.

COMPARATIVE EXAMPLE-5

1.5 kg of a solution with 15% of No. 3 sodium silicate was taken into 20 L-beaker and 10 L of pure water was added to dilute the solution. 1700 cc of a 5%-sulfuric acid solution was gradually dropped into the diluted solution for neutralization of the solution to obtain a precipitate. This precipitate was then subjected to washing, drying and grinding processes to previously prepare silicon compound powders. 1.7 kg of copper sulfate was taken into 20 L-beaker and 10 L of pure water was added for stirring and dissolution, and further the full amount of the above-previously prepared silicon compound was added to prepare a precipitate mother solution (A-solution). Separately from this, 0.87 kg of sodium carbonate was taken into 20 L-beaker and 10 L of pure water was added for dissolution to prepare a precipitate agent solution (B-solution). The A-solution was dropped gradually into the B-solution which was being stirred hardly to form a precipitate. The obtained precipitate was then subjected to aging and subsequent sufficient washing and filtration before drying the same in air at 110° C. for obtaining dry powders.

The obtained powders were transferred into a kneader and an approximate amount of pure water was added and sufficiently mixed prior to an extrusion molding. The extrusions were then dried at 110° C. thereby to prepare a metal hydride containing exhaust gas treatment agent of Comparative Example-5. Of this treatment agent, Cu/Si(atomic ratio), BET-surface area and crystalline size of copper compound were as shown on Table-1, while the measured result of the harm-removal performance of the metal hydride in the presence of 4%-hydrogen and heat generation in this harm-removal measurement were as shown on Table3.

COMPARATIVE EXAMPLE-6

A metal hydride containing exhaust gas treatment agent of Comparative Example-6 was prepared in the same preparation method as Example-9, except that respective amounts in use of copper sulfate, a solution with 15% of No. 3 sodium silicate and sodium carbonate were 2.09 kg, 0.30 kg and 1.04 kg. Of this treatment agent, Cu/Si(atomic ratio), BET-surface area and crystalline size of copper compound were as shown on Table-1, while the measured result of the harm-removal performance of the metal hydride in the presence of 4%-hydrogen and heat generation in this harm-removal measurement were as shown on Table-3.

COMPARATIVE EXAMPLE-7

A metal hydride containing exhaust gas treatment agent of Comparative Example-7 was prepared in the same preparation method as Example-9, except that respective amounts in use of copper sulfate, a solution with 15% of No. 3 sodium silicate and sodium carbonate were 0.88 kg, 3.80 kg and 0.20 kg. Of this treatment agent, Cu/Si(atomic ratio), BET-surface area and crystalline size of copper compound were as shown on Table-1, while the measured result of the harm-removal performance of the metal hydride in the presence of 4%-hydrogen and heat generation in this harm-removal measurement were as shown on Table-3.

COMPARATIVE EXAMPLE-8

A metal hydride containing exhaust gas treatment agent of Comparative Example-8 was prepared in the same preparation method as Example-9, except that instead of the drying process of the extrusions, the extrusions were baked at a temperature of 350° C. to prepare an oxide. Of this treatment agent, Cu/Si(atomic ratio), BET-surface area and crystalline size of copper compound were as shown on Table-1, while the measured result of the harm-removal performance of the metal hydride in the presence of 4%-hydrogen and heat generation in this harm-removal measurement were as shown on Table-3.

COMPARATIVE EXAMPLE-9

A metal hydride containing exhaust gas treatment agent of Comparative Example-9 was prepared in the same preparation method as Example-11, except that instead of the drying process of the extrusions, the extrusions were baked at a temperature of 350° C. to prepare an oxide. Of this treatment agent, Cu/Si(atomic ratio), BET-surface area and crystalline size of copper compound were as shown on Table-1, while the measured result of the harm-removal performance of the metal hydride in the presence of 4%-hydrogen and heat generation in this harm removal measurement were as shown on Table-3.

TABLE 1 compositional ratio of metal hydride containing gas treatment agent and result of measurement of property hereof

|  | Cu/Si (atomic ratio) | BET-surface area (m2/g) | Crystalline size of copper compound (nm) |
|---|---|---|---|
| Ex.- 1 | 1.54/1 | 320 | 4 |
| Ex.- 2 | 2.44/1 | 250 | 8 |
| Ex.- 3 | 4.56/1 | 180 | 15 |
| Ex.- 4 | 7.43/1 | 120 | 40 |
| Ex.- 5 | 2.44/1 | 230 | 10 |
| Ex.- 6 | 2.44/1 | 220 | 12 |
| Ex.- 7 | 2.44/1 | 230 | 9 |
| Ex.- 8 | 2.44/1 | 260 | 6 |
| Ex.- 9 | 1.54/1 | 320 | 4 |
| Ex.- 10 | 2.44/1 | 250 | 8 |
| Ex.- 11 | 4.56/1 | 180 | 15 |
| Ex.- 12 | 7.43/1 | 120 | 40 |
| Ex.- 13 | 2.44/1 | 230 | 10 |
| Ex.- 14 | 2.44/1 | 220 | 12 |
| Ex.- 15 | 2.44/1 | 230 | 9 |
| Ex.- 16 | 2.44/1 | 260 | 6 |
| Comp.Ex.- 1 | contain just Cu | 50 | 100 |
| Comp.Ex.- 2 | 2.44/1 | 80 | 74 |
| Comp.Ex.- 3 | 15.0/1 | 90 | 69 |
| Comp.Ex.- 4 | 0.50/1 | 420 | amorphous |
| Comp.Ex.- 5 | 2.44/1 | 80 | 74 |
| Comp.Ex.- 6 | 15.0/1 | 90 | 69 |
| Comp.Ex.- 7 | 0.50/1 | 420 | amorphous |
| Comp.Ex.- 8 | 1.54/1 | 290 | 7 |
| Comp.Ex.- 9 | 4.56/1 | 150 | 23 |

TABLE 2 result of measurement of harm-removal performance of treatment agent to metal hydride gas (metal hydride containing gas not containing $H_2$)

|  | SiH4 (L/kg) | PH3 (L/kg) |
|---|---|---|
| Ex.- 1 | 38 | 87 |
| Ex.- 2 | 45 | 105 |
| Ex.- 3 | 40 | 102 |
| Ex.- 4 | 35 | 85 |
| Ex.- 5 | 43 | 100 |
| Ex.- 6 | 40 | 98 |
| Ex.- 7 | 36 | 80 |
| Ex.- 8 | 44 | 107 |
| Comp.Ex.- 1 | 20 | 41 |
| Comp.Ex.- 2 | 25 | 47 |
| Comp.Ex.- 3 | 18 | 35 |
| Comp.Ex.- 4 | 17 | 30 |

TABLE 3 result of measurement of harm-removal performance of treatment agent to metal hydride gas (metal hydride containing gas containing $H_2$ at 4%)

|  | SiH4 (L/kg) | PH3 (L/kg) | Heat generation in performance measurement (increased temperature) SiH4 | PH3 |
|---|---|---|---|---|
| Ex.- 9 | 40 | 90 | 50 ~ 60° C. | 35 ~ 45° C. |
| Ex.- 10 | 44 | 108 | 50 ~ 60° C. | 35 ~ 45° C. |
| Ex.- 11 | 41 | 105 | 50 ~ 60° C. | 35 ~ 45° C. |

TABLE 3-continued result of measurement of harm-removal performance of treatment agent to metal hydride gas
(metal hydride containing gas containing $H_2$ at 4%

| | SiH4 (L/kg) | PH3 (L/kg) | Heat generation in performance measurement (increased temperature) SiH4 | PH3 |
|---|---|---|---|---|
| Ex.- 12 | 37 | 87 | 50 ~ 60° C. | 35 ~ 45° C. |
| Ex.- 13 | 45 | 104 | 50 ~ 60° C. | 35 ~ 45° C. |
| Ex.- 14 | 41 | 101 | 50 ~ 60° C. | 35 ~ 45° C. |
| Ex.- 15 | 38 | 83 | 50 ~ 60° C. | 35 ~ 45° C. |
| Ex.- 16 | 46 | 110 | 50 ~ 60° C. | 35 ~ 45° C. |
| Comp.Ex.-5 | 25 | 47 | 45 ~ 55° C. | 30 ~ 40° C. |
| Comp.Ex.-6 | 19 | 26 | 40 ~ 50° C. | 30 ~ 35° C. |
| Comp.Ex.-7 | 18 | 32 | 40 ~ 50° C. | 30 ~ 35° C. |
| Comp.Ex.-8 | | | Measurement discontinued due to uncontrolled reaction | Measurement discontinued due to uncontrolled reaction |
| Comp.Ex.-9 | | | | |

INDUSTRIAL APPLICABILITY

The agent is a mixture of either copper hydroxide or basic copper carbonate and silicon compound or a mixture, wherein parts of said copper compound and said silicon compound form a complex, for which reason the treatment agent is obtained, which shows a high harm-removing performance to the metal hydride gas and a low heat generation, and is useful for treatment of the exhaust gas which may cause a reduction by hydrogen of metal component.

The invention claimed is:

1. A method of producing a treatment agent for metal hydride containing exhaust gas, wherein said agent comprises a mixture of a silicon compound with basic copper carbonate, which is produced by a neutralization reaction between a copper salts solution and an alkali-silicates-containing alkali carbonate solution or an alkali-silicates-containing alkali bicarbonates solution, or comprises such a mixture that a part of said basic copper carbonate forms a complex with a silicon compound, wherein said mixture has a Cu/Si atomic ratio ranged from 1~10, wherein if an alkali carbonate solution or an alkali bicarbonate is used in a neutralization reaction with a copper salts solution, a carbonate content calculated as carbon dioxide gas is not less than 5% of a total weight.

2. A method for treatment of metal hydride containing exhaust gas, said method comprising the step of: contacting said metal hydride containing exhaust gas with a treatment agent comprising a mixture of a silicon compound with basic copper carbonate, which is produced by a neutralization reaction between a copper salts solution and an alkali-silicates-containing alkali carbonate solution or an alkali-silicates-containing alkali bicarbonates solution, or comprises such a mixture that a part of said basic copper carbonate forms a complex with a silicon compound, wherein said mixture has a Cu/Si atomic ratio ranged from 1~10, wherein if an alkali carbonate solution or an alkali bicarbonate is used in a neutralization reaction with a copper salts solution, then said metal hydride containing exhaust gas is made into contact with said treatment agent such that a carbonate content calculated as carbon dioxide gas is not less than 5% of a total weight.

* * * * *